United States Patent
Coenen et al.

(10) Patent No.: US 6,290,605 B1
(45) Date of Patent: Sep. 18, 2001

(54) ASSEMBLY COMPRISING A UNIVERSAL JOINT AND A GEAR FOR A DRIVE

(75) Inventors: Karl Coenen, Seigburg; Manfred Eidam, Wilthen, both of (DE)

(73) Assignees: GKN Walterscheid GmbH, Lohmar (DE); GKN Walterscheid Getriebe GmbH, Kirschau (DE)

( * ) Notice: Subject to any disclaimer, the term of this patent is extended or adjusted under 35 U.S.C. 154(b) by 0 days.

(21) Appl. No.: 09/496,544

(22) Filed: Feb. 2, 2000

(30) Foreign Application Priority Data

Feb. 6, 1999 (DE) .............................................. 199 04 960

(51) Int. Cl.[7] .................................................... F16D 3/16
(52) U.S. Cl. ........................ 464/125; 464/134; 74/421 R
(58) Field of Search .................................. 464/125, 134, 464/135, 136, 178, 109, 126; 74/421 R

(56) References Cited

U.S. PATENT DOCUMENTS

| | | | |
|---|---|---|---|
| 1,254,763 | * | 1/1918 | Barker .............................. 464/125 X |
| 1,836,706 | * | 12/1931 | Davis ............................... 464/136 X |
| 2,111,693 | | 3/1938 | Schnuck . |
| 2,709,902 | | 6/1955 | Wildhaber . |
| 2,770,114 | | 11/1956 | Slaght . |
| 2,924,985 | | 2/1960 | Crankshaw . |
| 4,289,213 | | 9/1981 | Seaman . |
| 4,303,400 | | 12/1981 | Yano et al. . |
| 5,669,460 | | 9/1997 | Showalter . |

FOREIGN PATENT DOCUMENTS

| | | | |
|---|---|---|---|
| 2809665 A1 | | 9/1979 | (DE) . |
| 165162 | * | 6/1921 | (GB) ................................... 464/125 |
| 1472414 | | 5/1977 | (GB) . |

* cited by examiner

Primary Examiner—Lynne H. Browne
Assistant Examiner—Greg Binda
(74) Attorney, Agent, or Firm—Harness, Dickey & Pierce, P.L.C.

(57) ABSTRACT

The invention relates to an assembly having a universal joint (1) with a first joint yoke (2), a second joint yoke (3), a cross member (4) and a gear (5). The first joint yoke (2) is rotatable around a first axis of rotation (6). The second joint yoke (3) is rotatable around a second axis of rotation (7). The cross member unit (4) articulatable connects the joint yokes (2, 3) to one another. Thus, angles of their axes of rotation (6, 7) are adjustable relative to one another. The gear (5) acts as a drive. The gear (5) is connected in a rotationally fast way to the first joint yoke (2). The gear (5) is arranged co-axially relative to the axis of rotation (6) around the center of the cross member unit (4). Thus, this assembly reduces the size of the angles of articulation of universal joints of a short driveshaft.

4 Claims, 2 Drawing Sheets

ASSEMBLY COMPRISING A UNIVERSAL JOINT AND A GEAR FOR A DRIVE

CROSS-REFERENCE TO RELATED APPLICATIONS

This application claims priority upon German application 199 04 960.2 filed Feb. 6, 1999, which is incorporated herein by reference.

BACKGROUND OF THE INVENTION

The invention relates to an assembly comprising a universal joint and a drive gear. The universal joint includes a first joint yoke rotatable around a first axis of rotation, a second joint yoke rotatable around a second axis of rotation and a cross member unit. The cross member connects the joint yokes to one another. The joint yokes are articulatable relative to one another so that the angles of their axes of rotation can be adjusted relative to one another.

Driveshafts connected to at least one drive primarily use this type of universal joint assemblies. Especially in agricultural implements, such as forage harvesters, the drive is effected via driveshafts. The driveshafts are connected to a drive at the input end and to a drive at the output end. The joint yokes of the driveshaft joints at the drive end are each connected to a drive journal which projects from the drive housing. The drive journal, inside the drive, is either gear-shaped or connected to a gear.

In the case of forage harvesters, the chopped material is fed into the harvester by a feeding system which includes upper and lower rollers. The feeding system is driven by a drive and is arranged between two wheels of an axle. The height of the lower rollers of the feeding system is fixed. The height of the upper rollers is adjustable as a function of the quantity of chopped material. The lower rollers are driven by a drive driven by a driveshaft. The upper rollers are driven by a further drive which is driven by a further driveshaft. At the input end, both driveshafts are connected to a drive which is driven by a shaft of a tractor or of a self-driving working machine or of a hydro-motor. Together with the upper and lower rollers, the drives for driving the rollers, the driveshafts and the drive at the input end are arranged between the driving wheels of the tractor or of the self-driving working machine. The installation lengths of the drive shafts are therefore greatly restricted. However, the upper rollers require a considerable range for height adjusting purposes, so that large articulation angles may occur for the drive driving the upper rollers. In consequence, the service life of the driveshaft is reduced considerably.

SUMMARY OF THE INVENTION

It is an object of the present invention to provide an assembly with a universal joint and a gear for a drive of the initially mentioned type. The assembly requires smaller articulation angles as compared to conventional assemblies used in a driveshaft. The adjustment of the joint yokes at the drive end remains the same.

In accordance with the invention, a gear for a drive is connected to the first joint yoke in a rotationally fast way. The gear is arranged co-axially relative to the axis of rotation of the first joint yoke around the center of the cross member unit.

When using such an assembly for a universal joint of a driveshaft, the joint with the inventive assembly is positioned inside the drive housing. The distance between the joint centers of the two joints (i.e. between the centers of their cross member units) of the driveshaft is increased compared to a driveshaft with conventional assembly joints with the joint centers positioned outside the drives. While the parallel displacement of the axes of rotation of the joint yokes at the drive end remains the same, it is possible to achieve smaller articulation angles for a driveshaft having an assembly in accordance with the invention. The smaller articulation angles result in a longer service life of the joints.

According to a preferred embodiment, the assembly includes a drive housing. The first joint yoke, in a region removed from the second joint yoke, includes a journal which extends along the first axis of rotation. The journal is supported in a bore of the drive housing. The first joint yoke changes bell-like in the direction of the second joint yoke into a cylindrical portion. Radially extending bores are provided in the cylindrical portion for receiving bearing bushes of the cross member unit. The gear is arranged on the circumferential face of the cylindrical portion. The cylindrical portion is supported in a further bore of the drive housing. The joint yoke is thus supported in a drive housing on both sides of the gear, so that the lowest possible moments occur in the bearings.

In order to outwardly seal the drive and, optionally, to include the lubrication of the universal joint in the lubrication system of the drive, a seal is provided between the cylindrical portion of the first joint yoke and the second joint yoke or between the cylindrical portion of the first joint yoke and a shaft portion connected to the second joint yoke. A further seal is provided between the cylindrical portion of the first joint yoke and the bore supporting the cylindrical portion of the first joint yoke.

According to an advantageous embodiment, the seal between the cylindrical portion of the first joint yoke and the second joint yoke or between the cylindrical portion of the first joint yoke and a shaft portion connected to the second joint yoke is formed by a convoluted boot.

From the following detailed description, taken in conjunction with the accompanying drawings and subjoined claims, other objects and advantages of the present invention will become apparent to those skilled in the art.

BRIEF DESCRIPTION OF THE DRAWINGS

Preferred embodiments of the invention will be explained with reference to the drawing, wherein.

DETAILED DESCRIPTION OF THE PREFERRED EMBODIMENT

Figure 1:
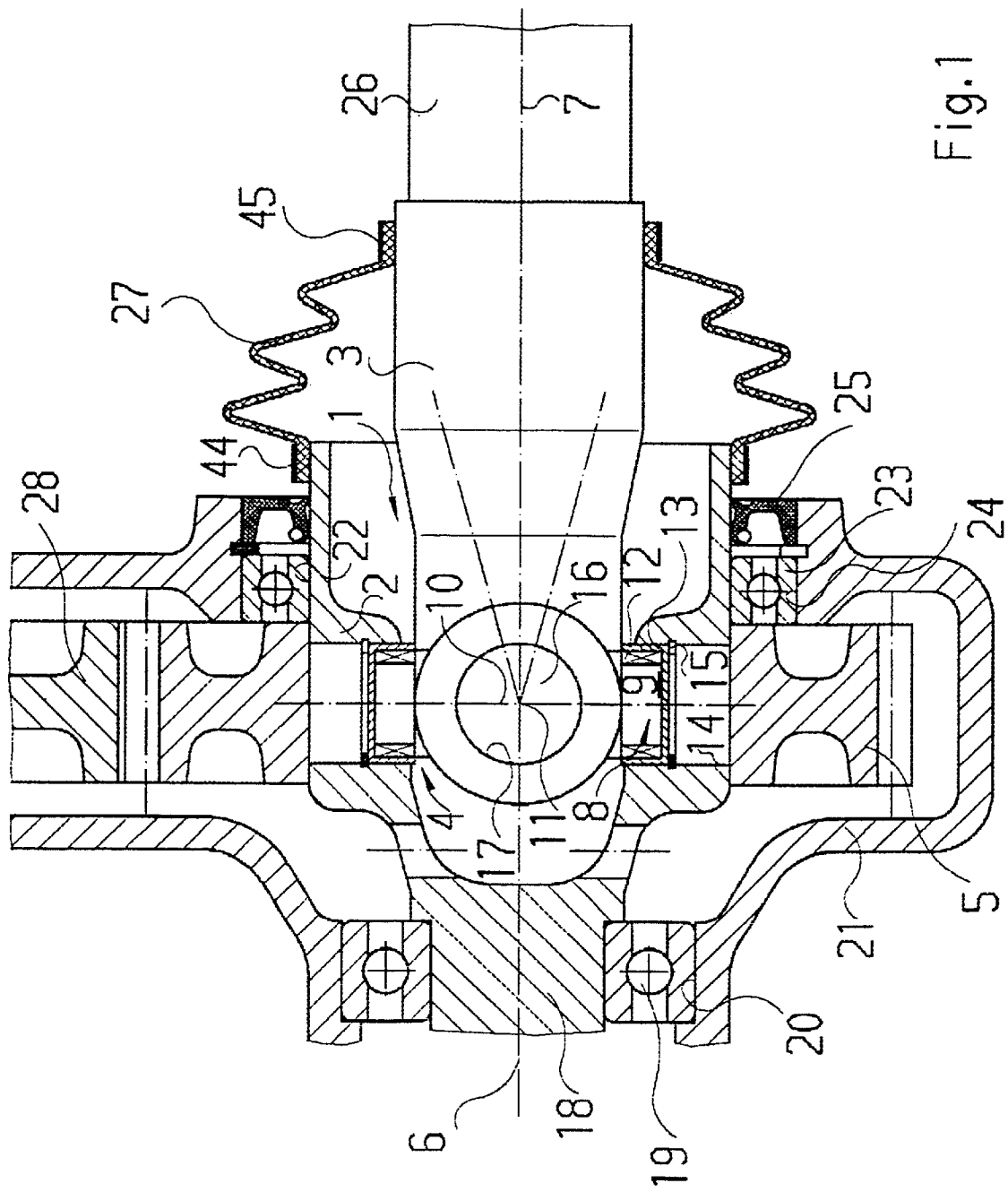
FIG. 1 is a partial cross-section view of an inventive assembly at a driveshaft, with the first joint yoke supported inside a drive housing.

FIG. 1 illustrates an assembly comprising a universal joint 1 with a first joint yoke 2, a second joint yoke 3 and a cross member unit 4. Also, a gear 5 is arranged around the universal joint 1. The first joint yoke 2 is rotatably arranged around the first axis of rotation 6. The second joint yoke is rotatably arranged around the second axis of rotation 7. The first joint yoke 2 and the second joint yoke 3 are articulatably connected to one another by the cross member unit 4. However, they are not shown at an angle relative to one another.

The cross member unit 4 includes a cross member 8 with first arms 9 and second arms. The first arms 9 are positioned on a common axis 10 and the second arms are positioned on a common axis 11. The point of intersection of the two axes 10, 11 forms the center of the cross member unit and the joint center. The first arms 9 are rotatably arranged via rolling contact members 12 in the bearing bush 13.

The bearing bushes 13 are arranged in receiving bores 14 which extend along the common axis 10 of the first arms 9. The bearing bushes 13 are positioned radially relative to the axis of rotation 6 of the first joint yoke 2. The bearing bushes 13 are held in the receiving bores 14 by securing rings 15. Analogously hereto, the second arms are rotatably arranged via rolling contact members in the bearing bushes 16. The bearing bushes 16 are positioned in receiving bores 17 of the second joint yoke 3. The receiving bores 17 extend along the common axis 11 of the second arms. The bearing bushes 16 are positioned radially relative to the second axis of rotation 7 of the second joint yoke 3.

The first joint yoke 2, in a region away from the second joint yoke 3, has a journal 18. The journal 18 is supported via a rolling contact bearing 19 in a bore 20 of a drive housing 21. The first joint yoke 2, from the journal 18, towards the second joint yoke 3, changes bell-like into a cylindrical portion 22. The gear 5 is arranged on the outer face of the cylindrical portion 22 around the joint center (center of the cross member unit). The gear 5 is connected to the first joint yoke 2 in a rotationally fast way. The central plane of the gear 5 is arranged perpendicularly relative to the second axis of rotation 7. The central plane extends through the joint center. A rolling contact bearing 23 is arranged In the subsequent region of the cylindrical portion 22, on the outside of the cylindrical portion. The first joint yoke 2, via rolling contact bearing 23, is supported in a bore 24 of the drive housing 21. Towards the outside, a shaft sealing ring 25 is arranged inside the bore 24 of the drive housing 21. The shaft sealing ring 25 has a sealing effect between the drive housing 21 and the first joint yoke 2 in the region of the bore 24. The second joint yoke 3 is guided out of the drive housing 21 through the bore 24 and is connected to a shaft portion 26 of a driveshaft. A convoluted boot 27 is provided to ensure complete sealing of the drive interior towards the outside. Tensioning rings 44, 45, fix the convoluted boot 27 on the outer face of the cylindrical portion 22, projecting from the bore 24, and on the outer face of the second joint yoke 3, respectively.

The gear 5 and thus the first joint yoke 2 can be driven by a gear 28. The gear 28 is shown only partially. The first joint yoke 2 is rotatably supported around the first axis of rotation 6 by the rolling contact bearings 19, 23. The cross member unit 4 transmits torque to the second joint yoke 3. The second joint yoke 3 is rotatable around the articulatable second axis of rotation 7. Since the joint center is arranged in the interior of the drive housing 21, it is possible to achieve smaller articulation angles than in conventional assemblies. Accordingly, the parallel offset of the first axis of rotation 6 relative to a further first axis of rotation of a second joint remains the same.

Figure 2:
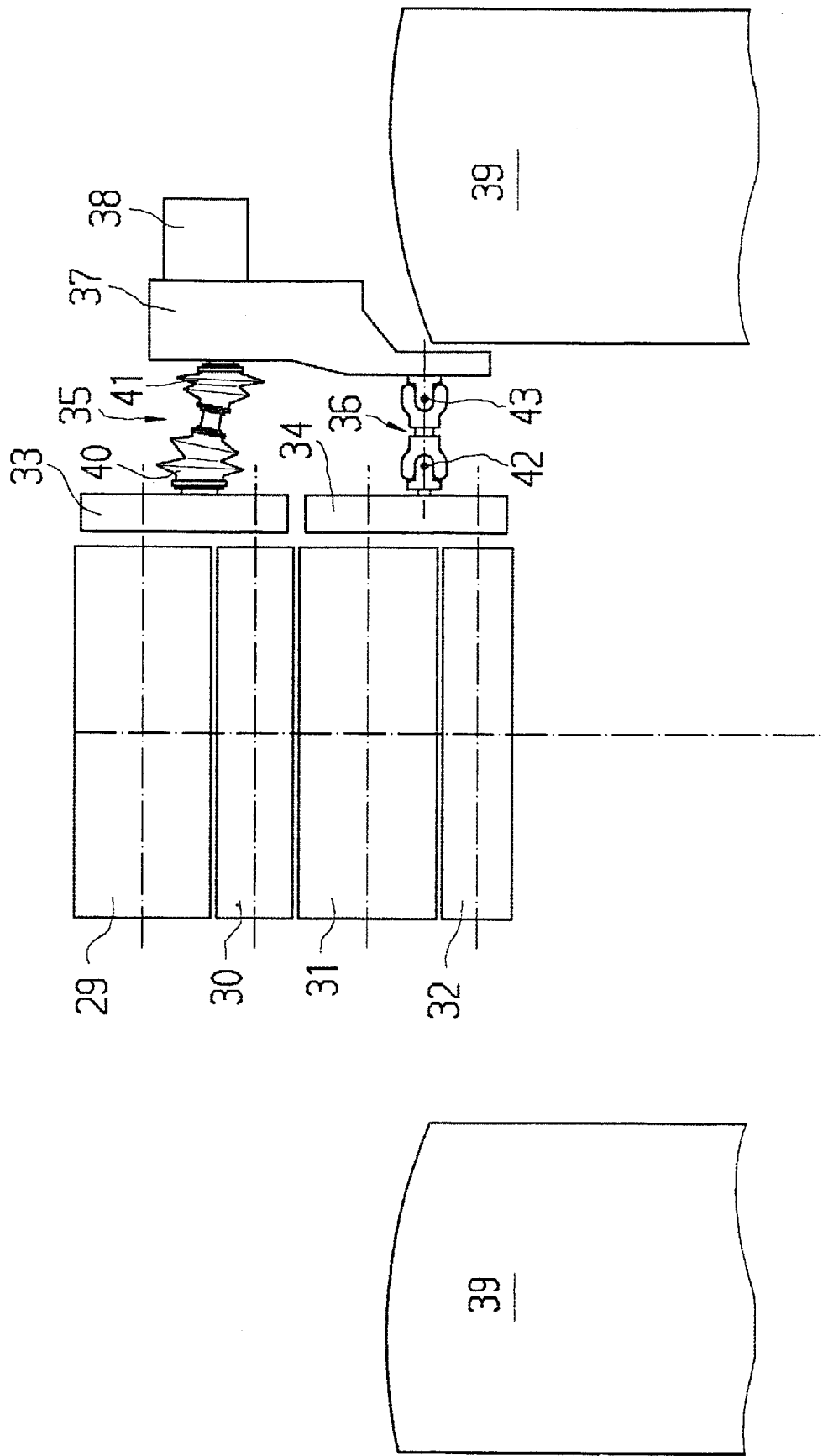
FIG. 2 is a diagrammatic illustration of a feeding system of a forage harvester having driveshafts with assemblies in accordance with the invention.

FIG. 2 is a diagrammatic illustration of a feeding system for a forage harvester. The feeding system serves to feed chopped material to a forage harvester. The feeding system includes two upper rollers 29, 30 and two lower rollers 31, 32. The upper rollers 29, 30 are driven by an upper drive 33 and the lower rollers 31, 32 are driven by a lower drive 34. The two drives 33, 34 are driven by driveshafts 35, 36. The driveshafts 35, 36 are connected to a common drive 37 which is driven by a drive 38. The upper rollers 29, 30, the lower rollers 31, 32, the upper drive 33, the lower drive 34 and the driveshafts 35, 36 are arranged between wheels 39 of an agricultural implement. Certain portions of the drive 37 are also arranged between the wheels 39. The upper rollers 29, 30 can be adjusted with respect to height as a function of the quantity of chopped material. Because of the small distance between the upper drive 33 and the drive 37, only very short driveshafts can be used. Since the upper rollers 29, 30 are adjustable within a large range of height adjustments, large articulation angles occur for the driveshaft 35. Therefore, the driveshaft 35, between the upper drive 33 and the drive 37, includes the inventive assemblies with a universal joint and a gear. The joints of the driveshaft 35 are arranged inside the drives 33, 37 and are sealed outwardly by convoluted boots 40, 41. Since adjustment is not required between the lower drive 34 and the drive 36, as a consequence large articulation angles of the joints 42, 43 of the driveshaft 36 do not occur. Thus, a conventional driveshaft is used in this case.

While the above detailed description describes the preferred embodiment of the present invention, the invention is susceptible to modification, variation and alteration without deviating from the scope and fair meaning of the subjoined claims.

What is claimed is:

1. An assembly, comprising:

a universal joint having a first joint yoke rotatable around a first axis of rotation, a second joint yoke rotatable around a second axis of rotation, a cross member unit connecting said joint yokes to one another such that said joint yokes are articulatable relative to one another so that the angles of their axes of rotation can be adjusted relative to one another; and a drive gear connected to said first joint yoke in a rotationally fast way, said drive gear arranged co-axially relative to the axis of rotation of the first joint yoke around the center of the cross member unit; and a drive housing, said first yoke directly rotatably supported in said drive housing.

2. An assembly according to claim 1, wherein said first joint yoke in a region removed from the second joint yoke having an arm extending along the first axis of rotation, said arm supported in a bore of said drive housing, said first joint yoke including a bell-like cylindrical portion in the direction of the second joint yoke, radially extending bores for receiving bearing bushes of the cross member unit being provided in said bell-like cylindrical portion; and the gear being arranged on the circumferential face of the cylindrical portion, said cylindrical portion being supported in a further bore of the drive housing.

3. An assembly according to claim 2, wherein a seal being provided between the cylindrical portion of the first joint yoke and the second joint yoke or between the cylindrical portion of the first joint yoke and a shaft portion connected to the second joint yoke, and a further seal provided between the cylindrical portion of the first joint yoke and the bore supporting the cylindrical portion of the first joint yoke.

4. An assembly according to claim 3, wherein a convoluted boot forms the seal between the cylindrical portion of the first joint yoke and the second joint yoke or between the cylindrical portion of the first joint yoke and the shaft portion connected to the second joint yoke.

* * * * *